(12) United States Patent
Chen et al.

(10) Patent No.: US 9,699,766 B2
(45) Date of Patent: Jul. 4, 2017

(54) METHOD, DEVICE AND SYSTEM FOR PROCESSING A MESSAGE

(71) Applicant: Huawei Technologies Co., Ltd., Shenzhen, Guangdong (CN)

(72) Inventors: Dong Chen, Shenzhen (CN); Xiaoxiao Zheng, Shenzhen (CN); Xiaoying Xu, Shenzhen (CN); Yong Qiu, Shenzhen (CN); Ying Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 629 days.

(21) Appl. No.: 13/928,986

(22) Filed: Jun. 27, 2013

(65) Prior Publication Data
US 2013/0286982 A1    Oct. 31, 2013

Related U.S. Application Data

(63) Continuation of application No. PCT/CN2011/084392, filed on Dec. 21, 2011.

(30) Foreign Application Priority Data

Dec. 31, 2010  (CN) .......................... 2010 1 0624356

(51) Int. Cl.
*H04W 72/04* (2009.01)
*H04W 4/12* (2009.01)
(Continued)

(52) U.S. Cl.
CPC ............ *H04W 72/04* (2013.01); *H04L 47/24* (2013.01); *H04L 47/2408* (2013.01);
(Continued)

(58) Field of Classification Search
None
See application file for complete search history.

(56) References Cited

U.S. PATENT DOCUMENTS 8,064,395 B2 * 11/2011 Gasparroni ............. H04L 45/24
370/329
8,315,187 B1 * 11/2012 White ................. H04L 47/6205
370/254
(Continued)

FOREIGN PATENT DOCUMENTS

CN         1406006 A      3/2003
CN         1536900 A     10/2004
(Continued)

OTHER PUBLICATIONS

"ETSI TS 123 107—Digital cellular telecommunications system (Phase 2+); Universal Mobile Telecommunications System (UMTS); LTE; Quality of Service (QoS) concept and architecture (3GPP TS 23.107 version 9.1.0 Release 9)," 3GPP TS 23.107, Version 9.1.0, 3rd Generation Partnership Project, Valbonne, France (Jun. 2010).

(Continued)

*Primary Examiner* — Chirag Shah
*Assistant Examiner* — Amar Persaud
(74) *Attorney, Agent, or Firm* — Leydig, Voit & Mayer, Ltd.

(57) ABSTRACT

The embodiment of the present disclosure provided a method, device, and system for processing a message. The method for processing a message comprises obtaining a traffic type of a service data packet, sending the message or a data packet that carries the traffic type to a radio network controller, where the radio network controller obtains the traffic type and performs scheduling processing on the service data packet according to a quality of service requirement corresponding to the traffic type. The present disclosure can realize performing resource allocation and scheduling processing on the applications corresponding to the service data packet based on the traffic type. Compared to resource allocation and scheduling processing based on the (Continued)

traffic type in the prior art, the granularity of classification of the present disclosure is more refined, and can realize more refined resource allocation and scheduling processing, and can effectively improve the efficiency of scheduling processing.

31 Claims, 9 Drawing Sheets

(51) Int. Cl.
  *H04W 72/12* (2009.01)
  *H04L 29/08* (2006.01)
  *H04L 12/851* (2013.01)
  *H04W 88/12* (2009.01)

(52) U.S. Cl.
  CPC ............ *H04L 67/322* (2013.01); *H04W 4/12* (2013.01); *H04W 72/1236* (2013.01); *H04W 88/12* (2013.01)

(56) References Cited

U.S. PATENT DOCUMENTS

| | | | |
|---|---|---|---|
| 2002/0093936 A1* | 7/2002 | Chuah | H04L 29/06 370/349 |
| 2004/0252699 A1* | 12/2004 | Drevon | H04W 92/12 370/395.21 |
| 2005/0070230 A1* | 3/2005 | Das | H04L 12/5695 455/69 |
| 2005/0237969 A1* | 10/2005 | Jung | H04W 76/022 370/328 |
| 2005/0255850 A1* | 11/2005 | Auterinen | H04M 15/00 455/452.2 |
| 2006/0251093 A1* | 11/2006 | Curcio | H04L 12/5695 370/412 |
| 2006/0268818 A1* | 11/2006 | Chen | H04L 12/4633 370/349 |
| 2007/0008902 A1 | 1/2007 | Yaramada et al. | |
| 2008/0037491 A1* | 2/2008 | Shaheen | H04W 4/00 370/338 |
| 2008/0056267 A1* | 3/2008 | Hill | H04L 45/302 370/392 |
| 2008/0107119 A1* | 5/2008 | Chen | H04L 12/5695 370/395.21 |
| 2008/0273488 A1* | 11/2008 | Shaheen | H04W 76/027 370/328 |
| 2008/0298300 A1* | 12/2008 | Mousset | H04L 29/06 370/328 |
| 2009/0016282 A1* | 1/2009 | Gasparroni | H04L 45/24 370/329 |
| 2009/0034428 A1* | 2/2009 | Jeong | H04L 47/10 370/252 |
| 2009/0196170 A1* | 8/2009 | Ayyagari | H04L 45/02 370/221 |
| 2009/0225712 A1 | 9/2009 | Stamoulis et al. | |
| 2011/0103310 A1* | 5/2011 | Stojanovski | H04L 12/66 370/328 |
| 2011/0242978 A1* | 10/2011 | Klein | H04L 47/24 370/235 |
| 2012/0005351 A1* | 1/2012 | Dhesikan | H04L 65/1069 709/227 |
| 2012/0047096 A1* | 2/2012 | Duffield | H04L 43/045 706/12 |
| 2012/0307784 A1* | 12/2012 | Heden | H04L 12/5695 370/329 |
| 2013/0121161 A1* | 5/2013 | Szab | H04L 43/0876 370/241 |
| 2013/0286982 A1* | 10/2013 | Chen | H04W 4/12 370/329 |

FOREIGN PATENT DOCUMENTS

| | | |
|---|---|---|
| CN | 1773986 A | 5/2006 |
| CN | 1852506 A | 10/2006 |
| CN | 101060690 A | 10/2007 |
| CN | 101175286 A | 5/2008 |
| CN | 101258714 A | 9/2008 |
| CN | 101500277 A | 8/2009 |
| CN | 101541048 A | 9/2009 |
| CN | 101669332 A | 3/2010 |
| EP | 2239974 A2 | 10/2010 |
| EP | 2416537 A1 | 2/2012 |
| GB | 2399716 A | 9/2004 |

OTHER PUBLICATIONS

Garriga et al., "QoS Load Differentiation Application in a UTRAN Live Network," IEEE, New York, New York (2009).

"3GPP TS 36.331—3$^{rd}$ Generation Partnership Project; Technical Specification Group Radio Access Network; Evolved Universal Terrestrial Radio Access (E-UTRA); Radio Resource Control (RRC); Protocol specification (Release 10)," Mar. 2011, Version 10.1.0, 3$^{rd}$ Generation Partnership Project, Valbonne, France.

"3GPP TSGS2; QoS ad-hoc; Proposal to include "priority parameter" in the UMTS Bearer Service Parameters (Draft TR on QoS)," Apr. 1999, document S2-99232, 3$^{rd}$ Generation Partnership Project, Valbonne, France.

"Report of the 3GPP_TSG_SA_WG1_QoS (Services) Meeting #1(99-1)," May 1999, TSG-SA Working Group 1 (Services) meeting #3, Agenda: 6.3.1, 3$^{rd}$ Generation Partnership Project, Valbonne, France.

International Search Report in corresponding PCT Patent Application No. PCT/CN2011/084392 (Apr. 5, 2012).

Written Opinion in corresponding PCT Patent Application No. PCT/CN2011/084392 (Apr. 5, 2012).

* cited by examiner

METHOD, DEVICE AND SYSTEM FOR PROCESSING A MESSAGE

CROSS-REFERENCE TO RELATED APPLICATIONS

This application is a continuation of International Patent Application No. PCT/CN2011/084392, filed on Dec. 21, 2011, which claims priority to Chinese Patent Application No. 201010624356.4, filed on Dec. 31, 2010, both of which are hereby incorporated by reference in their entireties.

TECHNICAL FIELD

The present disclosure relates to communication technologies field, and more particularly, to a method, device and system for processing a message.

BACKGROUND

The type of quality of service (Quality of Service; hereinafter referred to as QoS) in the universal mobile telecommunications system (Universal Mobile Telecommunications System; hereinafter referred to as UMTS) can be approximately divided into four traffic classes (Traffic Class; hereinafter referred to as TC) including: session, stream, interaction and background. Normally, the real-time service includes session and stream, for example, a typical session application is audio, a typical stream application is video, and so on. The non-real time service includes interaction and background, for example, a typical interaction application is web browsing, a typical background application is email, and so on. The QoS demands are very different among these four types of applications.

In the prior art, the radio network controller (Radio Network Controller; hereinafter referred to as RNC) receives the radio access bearer (Radio Access Bearer; hereinafter referred to as RAB) distribution request information sent from UMTS terrestrial radio access network (UMTS Terrestrial Radio Access Network; hereinafter referred to as UTRAN), and obtains the negotiated QoS profile parameter from the RAB distribution request information. Afterwards, the RNC performs scheduling processing on the service data packet of the corresponding traffic class accord to the QoS profile parameter, furthermore the RNC may also send the QoS profile parameter to the base station (NodeB), and the NodeB performs resource allocation and scheduling processing according to the QoS profile parameter.

During the process of realization of the present disclosure, the inventor found that the prior art has at least the following issues: with the popularity of using smart phones, more and more abundant packet switched (Packet Switched; hereinafter referred to as PS) applications are used in the mobile network, which makes one present TC cover many traffic types. But the classification of TC in the prior art is coarse-grained, and the RNC cannot perform more refined scheduling processing based on the QoS profile parameter information of the traffic type, which leads to low efficiency of scheduling processing in the prior art.

SUMMARY

Embodiments of the present disclosure provide a method, device and system for processing a message, which is used to overcome the defect of low efficiency of scheduling processing in the prior art, and can perform refined scheduling processing based on the traffic type.

An embodiment of the present disclosure provides a method for processing a message, comprising: obtaining a traffic type of a service data packet; sending the message or a data packet that carries the traffic type to a radio network controller, so that the radio network controller obtains the traffic type and performs scheduling processing on the service data packet according to a quality of service requirement corresponding to the traffic type.

Another embodiment of the present disclosure provides a method for processing a message, comprising: receiving the message or a data packet that carries a traffic type of a service data packet sent from a network element equipment; obtaining the traffic type; performing scheduling processing on the service data packet according to a quality of service requirement corresponding to the traffic type.

Further another embodiment of the present disclosure provides a network element equipment, comprising: an obtaining module, configured to obtain a traffic type of a service data packet; a sending module, configured to send a message or a data packet that carries the traffic type to a radio network controller, so that the radio network controller obtains the traffic type and performs scheduling processing on the service data packet according to a quality of service requirement corresponding to the traffic type.

Further another embodiment of the present disclosure provides a radio network controller equipment, comprising: a receiving module, configured to receive a message or a data packet which carries a traffic type of a service data packet sent from a network element equipment; an obtaining module, configured to obtain the traffic type; a scheduling module, configured to perform scheduling processing on the service data packet according to a quality of service requirement corresponding to the traffic type.

Further another embodiment of the present disclosure further provides a system for processing a message, comprising: a network element equipment, configured to obtain a traffic type of a service data packet; and configured to send a message or a data packet that carries the traffic type to a radio network controller; the radio network controller equipment, configured to receive the message or the data packet that carries the traffic type of the service data packet sent from the network element equipment; configured to obtain the traffic type; and configured to perform scheduling processing on the service data packet according to a quality of service requirement corresponding to the traffic type.

For the method, device and system for processing a message of the embodiments of the present disclosure, it is the network element equipment that obtains the traffic type by and sends a message or a data packet that carries the traffic type to a radio network controller. And it is the radio network controller that obtains the traffic type and performs scheduling processing on the service data packet according to a QoS requirement corresponding to the traffic type. The embodiments of the present disclosure can perform scheduling processing on the service data packet based on the traffic type. Comparing with the scheduling processing based on the traffic class in the prior art, the grain size of classification of the present disclosure is more refined, so the embodiments of the present disclosure can realize more refined scheduling processing, and can effectively improve the efficiency of scheduling processing.

BRIEF DESCRIPTION OF THE DRAWINGS

In order to describe the embodiments of the present disclosure or the technical solutions in prior art more clearly, a brief introduction on the accompanying drawings which are needed in the description of the embodiments or the prior art are given below. Apparently, the accompanying drawings in the description below are some of the embodiments of the present disclosure, based on which other drawings can be obtained by those skilled in the art without any creative effort.

DESCRIPTION OF EMBODIMENTS

In order to make objectives, technical solutions, and advantages of the present disclosure more clear, a detailed description of the technical solutions of the embodiments of the present disclosure will be given below in connection with the accompanying drawings. The described embodiments are only a part, but not all, of the embodiments of the present disclosure. All of the other embodiments that are obtained by those skilled in the art based on the embodiments in the disclosure without any inventive efforts fall into the scope protected by the present disclosure.

Figure 1:
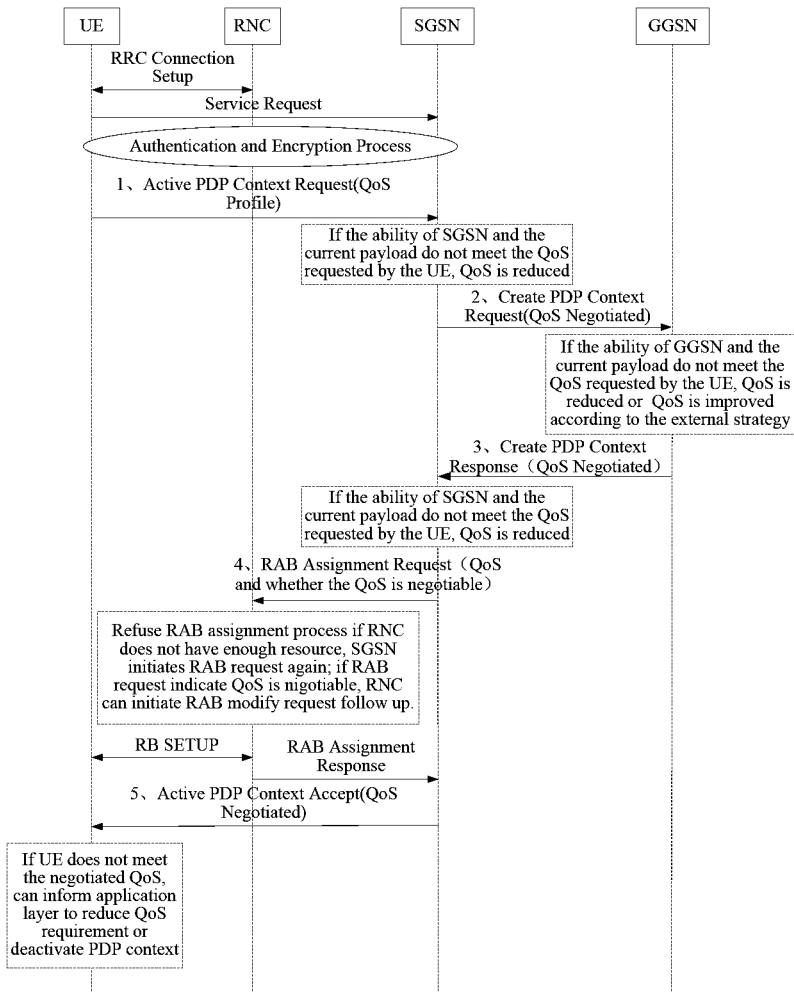
FIG. 1 is a signaling diagram of QoS negotiation process of UMTS PS domain in the prior art.

FIG. 1 is a signaling diagram of QoS negotiation process of UMTS PS domain, according to one embodiment.

1. A user equipment (User Equipment; hereinafter referred to as UE) initiates an active packet data protocol (Packet Data Protocol; hereinafter referred to as PDP) context request, namely Active PDP Context Request. The Active PDP Context Request includes the QoS profile (Profile) parameter requested by the UE, where the QoS Profile includes TC.

Additionally, before the UE initiates the Active PDP Context Request, the method further involves the following steps: the UE negotiates with an RNC to perform the radio resource control (Radio Resource Control; hereinafter referred to as RRC) connection (Connection) setup (Setup); afterwards, the UE initiates a service request (Service Request) to a serving GPRS support node (Serving GPRS (General Packet Radio Service) Support Node; hereinafter referred to as SGSN), and performs the process of authentication and encryption with the SGSN.

2. After receiving the active PDP context request, the SGSN can reduce the QoS profile parameter according to its own ability and the current load request; and then initiates a create (Create) PDP Context request to the gateway GPRS support node (Gateway GPRS Support Node; hereinafter referred to as GGSN), where the Create PDP Context Request includes the QoS profile parameter to be negotiated (namely QoS Negotiated).

3. After receiving the Create PDP Context Request, the GGSN can reduce the QoS profile parameter according to its own ability and the current load condition, or can also increase the QoS according to the external strategy; and then sends the negotiated QoS profile parameter to the SGSN via Create PDP Context Response message.

4. After receiving the Create PDP Context Response message, the SGSN can limit the QoS profile parameter according to its own ability and the load condition again; and sends to the RNC the radio access bearer (Radio Access Bearer; hereinafter referred to as RAB) assignment (Assignment) request (Request) message, which includes the negotiated QoS profile parameter (including TC) and the information that indicates whether the QoS profile parameter can be negotiated. If the RNC does not have enough resources so as to reject the RAB assignment process, then the SGSN initiates the RAB negotiation process again; if the RAB Assignment Request message includes the information that indicates QoS profile parameter can be negotiated, then the RNC can initiate a RAB modify process in the process following the successful RAB setup to renegotiate the QoS profile parameter.

5. SGSN sends the Active PDP Context Accept message to the UE, where the Active PDP Context Accept message includes the negotiated QoS profile parameter. If the UE can not satisfy the negotiated QoS profile parameter, then the application layer can be informed to reduce the requirement of the QoS profile parameter, otherwise the UE deactivates the PDP Context Request if the requirement of the QoS profile parameter cannot be reduced.

After the UE has negotiated QoS with each network element equipment, a QoS profile parameter that can meet the requirements of the UE and each network element equipment can be obtained. Finally, the negotiated QoS profile parameter is sent to the NodeB by RNC, and the optimized resource allocation and scheduling processing are performed to the traffic class corresponding to the TC by the NodeB according to the negotiated QoS profile parameter. Using the UE visiting a webpage embedded with a video stream as an example, the service belongs to the interaction traffic class. In order to ensure the service experience of the video stream, the service occupies more resources compared with the pure webpage. In many cases, the user corresponding to the UE closes a webpage before watching the entire video, so that the NodeB may optimize resource allocation for the feature of individual service to save the network resource. The services of the same TC are allocated with one RAB, the radio access network (Radio Access Network; hereinafter referred to as RAN) can perform refined scheduling to every service in the one RAB, so that the NodeB can have a higher efficiency of performing resource allocation and scheduling processing. In the scenario of shortage of resources, the RNC or NodeB can selectively drop the packet according to the traffic class.

Figure 2:
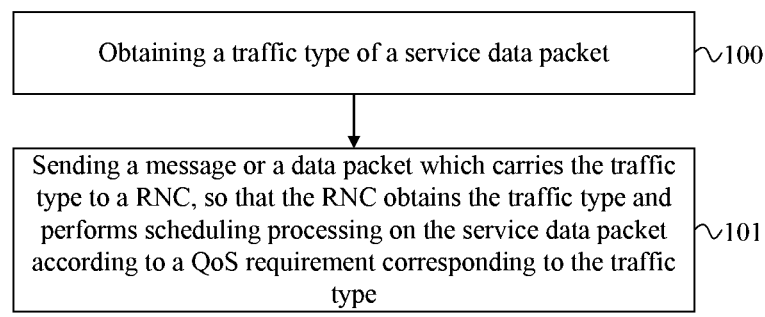
FIG. 2 is a flowchart of a method for processing a message according to one embodiment of the present disclosure.

FIG. 2 is a flowchart of a method for processing a message provided by one embodiment of the present disclosure. As shown in FIG. 2, the method for processing a message of the present embodiment may comprise the following steps.

Step 100: Obtaining a traffic type (Traffic Type; referred to as TT) of a service data packet.

Step 101: Sending a message or a data packet which carries the traffic type to a RNC, so that the RNC obtains the traffic type and performs scheduling processing on the service data packet according to a QoS requirement corresponding to the traffic type.

In present embodiment, the technical solution of the present disclosure is described at the side of a core network, and the specific subject executing the method can be a SGSN or a GGSN. The application scenario of the present embodiment is that after the UE negotiates the QoS profile parameter corresponding to one TC with each network element equipment of the core network, the UE requests some kind of application (for example, a messaging application, like QQ) from the network (for example, an Internet network). The network equipment of the core network obtains the traffic type of the service data packet, namely the traffic type of the application requested by the user, by checking the service data packet of the application of the UE sent from the Internet network. Afterwards, the network element equipment sends a message or a data packet which carries the application message to the RNC, so that the RNC obtains the traffic type, and can perform scheduling processing on the service data packet according the QoS requirement corresponding to the traffic type. For example, the NodeB performs scheduling processing selectively according to the priority level corresponding to the application in the QoS requirement.

The QoS requirement can include the QoS parameter, such as bandwidth corresponding to the traffic class, priority level, and so on.

In one embodiment, the QoS requirement of the present embodiment is set for the traffic type according to the formerly negotiated QoS profile parameter by the UE and each network element equipment of the network and the corresponding application features of the traffic type. That is to say, the value range of each QoS parameter in the QoS requirement is limited by each QoS parameter of the QoS profile parameter. The QoS requirement can be pre-set in the RNC or NodeB.

In the method for processing a message of the present disclosure, the network element equipment obtains a traffic type and sends a message or a data packet which carries the traffic type to a RNC; the RNC obtains the traffic type, and performs scheduling processing on a service data packet according to a QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

In the above embodiment, the step of obtaining the traffic type of the service data packet in step 100 can specifically comprise the following steps.

(1) Obtaining the traffic type by deep packet inspection (Deep Packet Inspection; hereinafter referred to as DPI) or shallow packet inspection (Shallow Packet Inspection; hereinafter referred to as SPI).

Specifically, the SGSN or GGSN obtains the traffic type of application by performing DPI or SPI inspection on the service data packet sent from Internet network.

(2) Obtaining the traffic type from the traffic detect function (Traffic Detect Function; hereinafter referred to as TDF) entity.

Specifically, when the GGSN and the TDF entity of policy and charging control (Policy and Charging Control; hereinafter referred to as PCC) enhanced architecture are arranged in the same equipment, the GGSN can obtain the traffic type, which is detected by the TDF entity, directly from the TDF.

(3) Obtaining the traffic type from the policy and charging rules function (Policy and Charging Rules Function; hereinafter referred to as PCRF) entity.

Specifically, when the GGSN and the TDF entity are not arranged in the same equipment, the GGSN can obtain the traffic type from the PCRF which obtains the traffic type detected by the TDF from the TDF entity. The GGSN can also interact with TDF to obtain the traffic type.

After obtaining the traffic type, the GGSN informs the traffic type to the SGSN according to the communication between the GGSN and SGSN.

Figure 3:
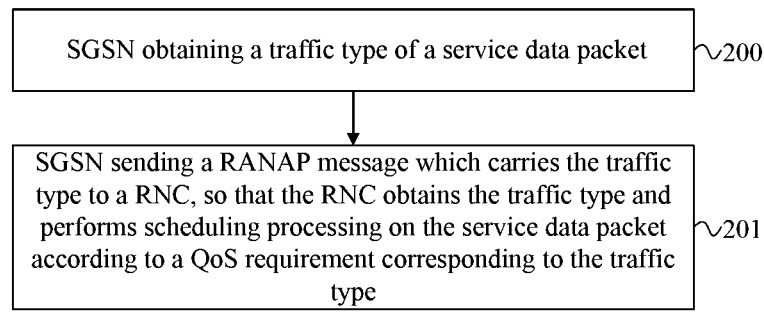
FIG. 3 is a flowchart of a method for processing a message according to another embodiment of the present disclosure.

FIG. 3 is a flowchart of another method for processing a message provided by one embodiment of the present disclosure. Based on the embodiment shown in the above-mentioned FIG. 2, as shown in FIG. 3, the subject executing the method for processing a message of the present embodiment is an SGSN. Specifically, the method for processing a message of the present embodiment may comprise the following steps.

Step 200: SGSN obtains a traffic type of a service data packet.

Specifically, by referring to the above-mentioned relevant records, the SGSN can obtain the traffic type through detection performed by itself, or can obtain the traffic type from the GGSN.

Step 201: SGSN sends a radio access network application part (Radio Access Network Application Part; hereinafter referred to as RANAP) message which carries the traffic type to a RNC, so that the RNC obtains the traffic type and performs scheduling processing on the service data packet according to a QoS requirement corresponding to the traffic type.

Specifically, the RANAP message is RAB assignment message in present embodiment.

In the method for processing a message of the present embodiment, the SGSN obtains a traffic type of a service data packet, and sends a RANAP message which carries the traffic type to a RNC, so that the RNC obtains the traffic type and performs scheduling processing on the service data packet according to a QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

Figure 4:
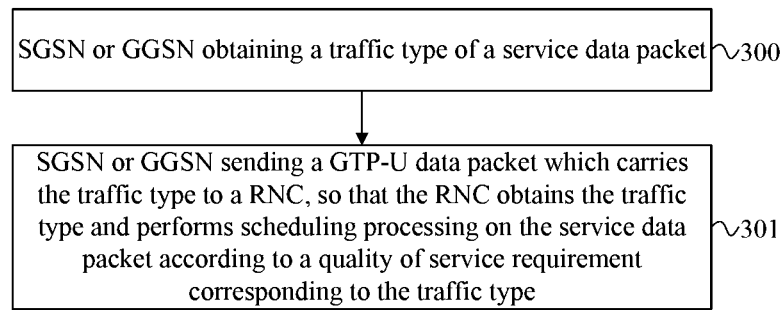
FIG. 4 is a flowchart of a method for processing a message according to another embodiment of the present disclosure.

FIG. 4 is a flowchart of another method for processing a message provided by one embodiment of the present disclosure. Based on the embodiment shown in the above-mentioned FIG. 2, as shown in FIG. 4, the subject executing the method for processing a message of the present embodiment is SGSN or GGSN. Specifically, the method for processing a message of the present embodiment may comprise the following steps.

Step 300: SGSN or GGSN obtains a traffic type of a service data packet.

Specifically, the details can refer to the above relevant records.

Step 301: SGSN or GGSN sends a GPRS tunneling protocol of user plane (GPRS Tunneling Protocol of user plane; hereinafter referred to as GTP-U) data packet which carries the traffic type to a RNC, so that the RNC obtains the traffic type and performs scheduling processing on the service data packet according to a QoS requirement corresponding to the traffic type.

Specifically, the SGSN or GGSN can add a field into the header of the GTP-U data packet, and carries the obtained traffic type in the added field.

In order to send to RNC the GTP-U data packet which carries the traffic type, according to the existing communication between GGSN and SGSN, the GGSN sends the GTP-U data packet which carries the traffic type to RAN via SGSN.

In the method for processing a message of the present embodiment, SGSN or GGSN obtains a traffic type of a service data packet, and sends a GTP-U data packet which carries the traffic type to a RNC, so that the RNC obtains the traffic type and performs scheduling processing on the service data packet according to a QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

Figure 5:
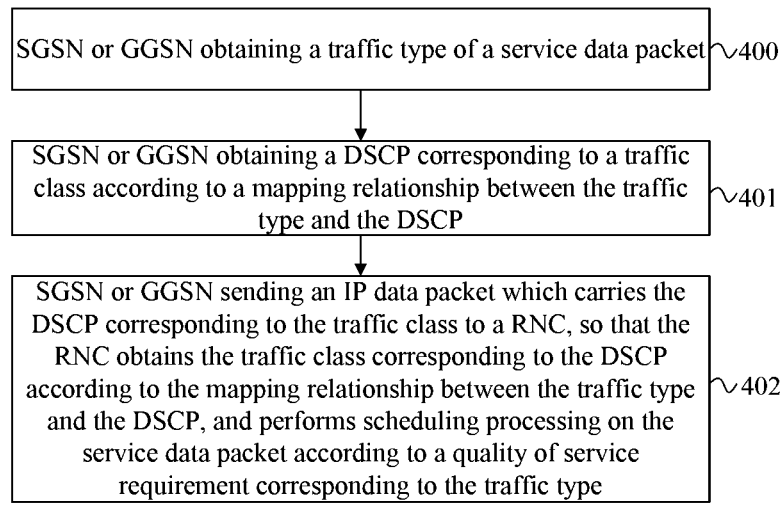
FIG. 5 is a flowchart of a method for processing a message according to another embodiment of the present disclosure.

FIG. 5 is a flowchart of another method for processing a message provided by one embodiment of the present disclosure. Based on the embodiment shown in the above-mentioned FIG. 2, as shown in FIG. 5, the subject executing the method for processing a message of the present embodiment is SGSN or GGSN. Specifically, the method for processing a message of the present embodiment may comprise the following steps.

Step 400: SGSN or GGSN obtains a traffic type of a service data packet.

Specifically, the details can refer to the above relevant records.

Step 401: SGSN or GGSN obtains a DSCP (Differentiated Services Code Point; hereinafter referred to as DSCP) corresponding to a traffic class according to a mapping relationship between the traffic type and the DSCP.

Step 402: SGSN or GGSN sends an internet protocol (Internet Protocol; hereinafter referred to as IP) data packet which carries the DSCP corresponding to the traffic class to a RNC, so that the RNC obtains the traffic class corresponding to the DSCP according to the mapping relationship between the traffic type and the DSCP; and performs scheduling processing on the service data packet according to a QoS requirement corresponding to the traffic type.

The method for processing a message of the present embodiment applies to implicitly carrying the traffic type of the service data packet. The DSCP corresponding to the traffic type is carried in the DSCP segment of 6 (six) bits of the header of the IP data packet according to the mapping relationship between the traffic type and DSCP.

In the method for processing a message of the present embodiment, SGSN or GGSN obtains a traffic type of a service data packet, and obtains a DSCP corresponding to a traffic class according to a mapping relationship between the traffic type and the DSCP; and sends an IP (Internet Protocol) data packet which carries the DSCP corresponding to the traffic class to a RNC, so that the RNC obtains the traffic class corresponding to the DSCP according to the mapping relationship between the traffic type and the DSCP, and performs scheduling processing on the service data packet according to a QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

Figure 6:
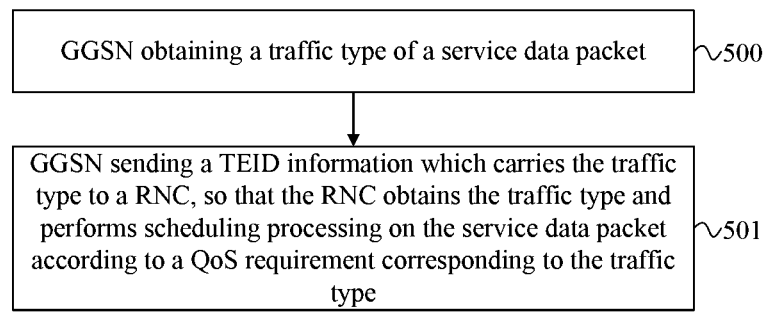
FIG. 6 is a flowchart of a method for processing a message according to another embodiment of the present disclosure.

FIG. 6 is a flowchart of another method for processing a message provided by one embodiment of the present disclosure. Based on the embodiment shown in the above-mentioned FIG. 2, as shown in FIG. 6, the subject executing the method for processing a message of the present embodiment is GGSN. Specifically, the method for processing a message of the present embodiment may comprise the following steps.

Step 500: GGSN obtains a traffic type of a service data packet.

Specifically, the details can refer to the above relevant records.

Step 501: GGSN sends a tunnel endpoint identifier (Tunnel Endpoint Identifier; hereinafter referred to as TEID) information which carries the traffic type to a RNC, so that the RNC obtains the traffic type, and performs scheduling processing on the service data packet according to a QoS requirement corresponding to the traffic type.

Specifically, the meaning of TEID is unified and self-defined by SGSN, GGSN and RNC, where the TEID further carries the traffic class to which the data packet in the tunnel belongs. The TEID is set in the header of the GTP-U data packet concretely. Specifically, the length of the current TEID is 4 (four) bytes, and some bits thereof are used to represent the traffic class. For example, in the above 4 (four) bytes, the least significant 1 (one) byte is reserved to represent the traffic class corresponding to the application, so that the identifier of the traffic class can be carried in the least significant 1 (one) byte.

In one example, to perform a certain traffic type, e.g., YouTube™ service by Google Inc., as an example below, the technical solutions of the present embodiment will be described in detail. The specific realization procedure is described in the following steps.

(a) During the procedure of RAB assignment, when the RNC sending the downlink TEID assigned by the RNC to the SGSN or GGSN, merely the most significant 3 (three) bytes are assigned, and the least significant 1 (one) byte is set to 0 (zero).

(b) When the GGSN receives downlink service data packet on the bearer, by checking the service data packet, the GGSN can determine that the traffic type corresponding to the service data packet is YouTube™, which is the GTP-U packet corresponding to the application is YouTube™ service. At this time, the identifier of the traffic class of the least significant bits of the TEID can be set as 00000001.

(c) After receiving the GTP-U data packet sent from SGSN, the GGSN determines the transmitting bearer just according to the most significant 3 bytes.

(d) After receiving the GTP-U data packet sent from SGSN, the RNC checks the most significant 3 bytes of TEID, and obtains the identifier corresponding to the traffic class according to the bits of the least significant byte. For example, when the corresponding identifier 00000001 is obtained, the corresponding traffic class can be determined as YouTube™ service.

Herein, the RNC can also perform scheduling processing on the sending of GTP-U data packet from RNC to NodeB according to the QoS requirement corresponding to the YouTube™ service. For example, the RNC may perform scheduling processing on the sending of GTP-U data packet according to the priority level of the QoS requirement.

(e) The RNC further sends the downlink data frame which carries the identifier 00000001 to the NodeB, so that the NodeB can perform resource distribution and scheduling processing according to the QoS requirement corresponding to the YouTube™ service.

It should be noted that on the basis of above-mentioned technical solution, the reserved least significant 1 byte of TEID may further carry the traffic class and the traffic type at the same time, wherein the traffic class refers to one of the 4 service classes such as session, stream, interaction and background defined in the primary standard. For example, the first 6 bits of the least significant 1 byte can be set to represent the traffic type corresponding to the application, and the last 2 bits of the least significant 1 byte can be set to represent the traffic class corresponding to the application. Correspondingly, the traffic type can be called as children class (Children TEID), and the traffic class can be called as parent class (Parent TEID). For example, the 000001 in the least significant byte can be set to represent that the GTP-U packet is YouTube™ service, while 000010 can be set to represent that the GTP-U packet is, for example, Twitter™ service provided by Twitter, Inc. In one embodiment, "10" in the last 2 bits represents Stream class, while "01" in the last 2 bits represents interaction, class and so on. For example, table 1 shows an arrangement of least significant byte in the TEID. In practical application, it can be arranged according to the requirement, and the practical realization steps can refer to the above-mentioned relevant descriptions.

TABLE 1

| TEID | |
|---|---|
| Children TEID | Parent TEID |
| 000000 (normal BE) | 01 |
| 000011 (gaming) | 01 |
| 000100 (heartbeat packet) | 01 |
| 000101 (specific ISP) | 01 |
| 000110 (custom/gold silver copper) | 01 |
| 000001 (YouTube ™) | 10 |
| 000101 (specific ISP) | 10 |
| 000110 (custom) | 10 |
| . . . | 11 |

In the method for processing a message of the present embodiment, GGSN obtains a traffic type of a service data packet, and sends a TEID information which carries the traffic type to a RNC, so that the RNC obtains the traffic type and performs scheduling processing on the service data packet according to a QoS requirement corresponding to the traffic type. The present embodiment can perform scheduling processing on the service data packet based on the traffic type. Comparing with the scheduling processing based on the traffic class of the prior art, the granularity of classification of the present embodiment is more refined, so the present embodiment can realize more refined scheduling processing, and can effectively improve the efficiency of scheduling processing.

In some embodiments, the following steps can be introduced after the step 101 based on the above-mentioned second embodiment: GGSN or SGSN sends a message or a data packet which carries the traffic type to a RNC, so that the RNC obtains the traffic type and performs scheduling processing on the service data packet according to a QoS requirement corresponding to the traffic type, or the RNC can further send a downlink data frame which carries the traffic type to the NodeB, so that the NodeB performs resource allocation and scheduling processing on the applications corresponding to the service data packet according to the QoS requirement corresponding to the traffic type. The present solution can also be applied after steps 201, 301, 402 or 501 in the above-mentioned embodiments.

As to the above-mentioned technical solutions, after obtaining the traffic type, the RNC further sends a downlink data frame which carries the traffic type to the NodeB, so that the NodeB performs resource allocation and scheduling processing on the applications corresponding to the service data packet according to the QoS requirement corresponding to the traffic type. The present embodiment can perform resource distribution and scheduling processing on the application corresponding to the service data packet based on the traffic type. Comparing with the resource allocation and scheduling processing based on the traffic class in the prior art, the granularity of classification of the present embodiment is more refined, so the present embodiment can realize more refined resource allocation and scheduling processing, and can effectively improve the efficiency of scheduling processing.

In the above-mentioned embodiment, after obtaining the traffic type, the RNC can directly send a downlink data frame which carries the traffic type to the NodeB or the RNC can send a downlink data frame which carries the traffic type via drifting RNC to the NodeB, so that the NodeB performs resource allocation and scheduling processing on the applications corresponding to the service data packet according to the QoS requirement corresponding to the traffic type. The procedure, that the NodeB performs resource allocation and scheduling processing on the applications corresponding to the service data packet according to the QoS requirement corresponding to the traffic type, can be the QoS management procedure. Certainly, the serving RNC can send the downlink data frame which carries the traffic type to the drifting RNC, so that the drifting RNC performs scheduling processing according to the traffic type. For example, the NodeB allocates resource for the UE which applies for the application according to the bandwidth parameter corresponding to the application in the QoS requirement, and the NodeB schedules the application according to the priority level corresponding to the application in the QoS requirement.

Figure 7:
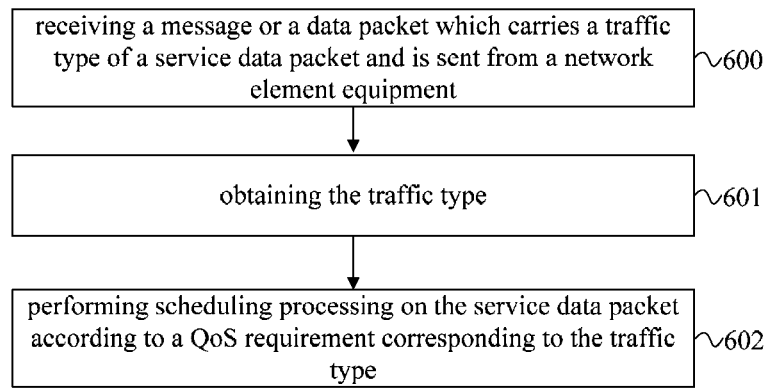
FIG. 7 is a flowchart of a method for processing a message according to another embodiment of the present disclosure.

FIG. 7 is a flowchart of another method for processing a message provided by one embodiment of the present disclosure. The subject executing the method for processing a message of the present embodiment is RNC. As shown in FIG. 7, the method for processing a message of the present embodiment can specifically comprises the following steps.

Step 600: Receiving a message or a data packet which carries a traffic type of a service data packet sent from a network element equipment.

Step 601: Obtaining the traffic type.

Step 602: Performing scheduling processing on the service data packet according to a QoS requirement corresponding to the traffic type.

The present embodiment describes the technical solution of the present disclosure in detail at the RNC side. The realization mechanism of the present embodiment is same as that of the embodiment shown in the above-mentioned FIG. 2. The description of the present embodiment can refer to the records of the above-mentioned FIG. 2, and is not repeated herein.

In the method for processing a message of the present embodiment, the RNC receives a message or a data packet which carries a traffic type of a service data packet and which is sent from a network element equipment; and obtains the traffic type and performs scheduling processing on the service data packet according to a QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

It should be noted that the step 600 of the above-mentioned embodiment can adopt the following several schemes to realize receiving a message or a data packet which carries the traffic type.

(1) In one embodiment, step 600 may be: RNC receiving the RANAP message which carries the traffic type sent from SGSN.

For example, the RANAP message in the present embodiment is RAB assignment message specifically.

The realization mechanism of the present embodiment is same as that of the embodiment shown in the above-mentioned FIG. 3. The description of the present embodiment can refer to the records of the above-mentioned FIG. 3, and is not repeated herein.

(2) In one embodiment, step 600 may be: RNC receiving the GTP-U data packet which carries the traffic type sent from SGSN or GGSN. Specifically, the traffic type can be carried in the added field of GTP-U header.

The realization mechanism of the present embodiment is same as that of the embodiment shown in the above-mentioned FIG. 4. The description of the present embodiment can refer to the records of the above-mentioned FIG. 4, and is not repeated herein.

(3) In one embodiment, step 600 may be: RNC receiving the IP data packet, which carries the DSCP corresponding to the traffic class sent from SGSN or GGSN according to the mapping relationship between the traffic type and the DSCP. Accordingly, the obtaining traffic type of the corresponding step 601 can be: obtaining the traffic type corresponding to the DSCP according to the mapping relationship between the traffic type and the DSCP.

The realization mechanism of the present embodiment is same as that of the embodiment shown in the above-mentioned FIG. 5. The description of the present embodiment can refer to the records of the above-mentioned FIG. 5, and is not repeated herein.

(4) In one embodiment, step 600 may be: RNC receiving the TEID information which carries the traffic type sent from GGSN. The TEID information can also carry the traffic class corresponding to the service data packet.

The realization mechanism of the present embodiment is same as that of the embodiment shown in the above-mentioned FIG. 6. The description of the present embodiment can refer to the records of the above-mentioned FIG. 6, and is not repeated herein.

The present embodiments can perform scheduling processing on the service data packet based on the traffic type. Comparing with the scheduling processing based on the traffic class in the prior art, the granularity of classification of the present embodiment is more refined, so the present embodiments can realize more refined scheduling processing, and can effectively improve the efficiency of scheduling processing.

In some embodiments, on the basis of the above-mentioned technical embodiments, the method further comprises: RNC sending the downlink data frame which carries the traffic type to the NodeB, so that the NodeB performs resource allocation and scheduling processing on the applications corresponding to the service data packet according to the QoS requirement corresponding to the traffic type.

By adopting the technical solutions of the above-mentioned embodiments, the RNC can send the downlink data frame which carries the traffic type to the NodeB, so that the NodeB performs resource allocation and scheduling processing on the applications corresponding to the service data packet according to the QoS requirement corresponding to the traffic type. The present embodiment can perform resource distribution and scheduling processing on the application corresponding to the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

On the basis of the above-mentioned embodiments, RNC can send the downlink data frame which carries the traffic type to the drifting RNC, so that the drifting RNC obtains the traffic type, and performs scheduling processing on the service data packet according to the QoS requirement corresponding to the traffic type, or further sends the downlink data frame which carries the traffic type to the NodeB, so that the NodeB performs resource allocation and scheduling processing on the applications corresponding to the service data packet according to the QoS requirement corresponding to the traffic type. The description of the present embodiment can refer to the records of the above-mentioned embodiments, and is not repeated herein.

According to various embodiments, a part of or all the steps of the embodiments of the above-mentioned methods can be accomplished by the related hardware instructed by the computer program. The program can be stored in a computer readable storage medium, and when the program is executed by a processor, the steps of the embodiments of each above-mentioned method are performed. Herein, the computer readable storage medium can be a medium used for storing the codes of the program, such as ROM, RAM, diskette or CD and so on.

Figure 8:
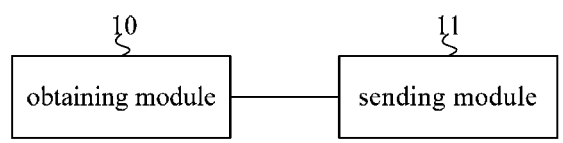
FIG. 8 is a structural diagram of a network element equipment according to one embodiment of the present disclosure.

FIG. 8 is a structural diagram of a network element equipment provided by one embodiment of the present disclosure. As shown in FIG. 8, the network element equipment of the present embodiment comprises an obtaining module 10 and a sending module 11.

Specifically, the obtaining module 10 is configured to obtain a traffic type of a service data packet. The sending module 11 is connected to the obtaining module 10, and is configured to send a message or a data packet which carries the traffic type obtained by the obtaining module 10 to a RNC, so that the RNC obtains the traffic type and performs scheduling processing on the service data packet according to a QoS requirement corresponding to the traffic type.

The realization mechanism about realizing processing a message through the above-mentioned modules of the network element equipment of the present embodiment is same as the realization records of the embodiments of the above-mentioned correlative methods. The details can refer to the records of the embodiments of the above-mentioned correlative method, and will not be provided again herein.

The network element equipment of the present embodiment obtains the traffic type through the above-mentioned modules, and sends the message or the data packet which carries the traffic type to the RNC, so that the RNC obtains the traffic type and performs scheduling processing on the service data packet according to the QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

In some embodiments, the obtaining module 10 in the above embodiment is specifically configured to obtain the traffic type through DPI or SPI, or can be specifically configured to obtain the traffic type from the TDF entity, or can be specifically configured to obtain the traffic type from the PCRF entity. The details can refer to the records of the embodiments of the above-mentioned correlative methods, and is not provided again herein.

In some embodiments, when the network element equipment of the above-mentioned embodiment is SGSN, the sending module 11 can be specifically configured to send the RANAP message which carries the traffic type obtained by the obtaining module 10 to the RNC, so that the RNC obtains the traffic type, and performs scheduling processing on the service data packet according to the QoS requirement corresponding to the traffic type.

In some embodiments, when the above-mentioned network element equipment is SGSN or GGSN, the sending module 11 can be specifically configured to send the GTP-U data packet which carries the traffic type obtained by the obtaining module 10 to the RNC, so that the RNC obtains the traffic type, and performs scheduling processing on the service data packet according to the QoS requirement corresponding to the traffic type.

In some embodiments, when the above-mentioned network element equipment is SGSN, the sending module 11 can be specifically configured to send the TEID information which carries the traffic type obtained by the obtaining module 10 to the RNC, so that the RNC obtains the traffic type, and performs scheduling processing on the service data packet according to the QoS requirement corresponding to the traffic type.

The sending module 11 in the above-mentioned embodiment can be specifically configured to send a message or a data packet which carries the traffic type to the RNC, so that the RNC obtains the traffic type, and performs scheduling processing on the service data packet according to the QoS requirement corresponding to the traffic type, or further sends the downlink data frame which carries the traffic type to the NodeB, so that the NodeB performs resource allocation and scheduling processing on the applications corresponding to the service data packet according to the QoS requirement corresponding to the traffic type.

The realization mechanism about realizing processing a message through the above-mentioned modules of the network element equipment of the above-mentioned embodiment is same as the realization records of the embodiments of the above-mentioned correlative methods. The details can refer to the records of the embodiments of the above-mentioned correlative method, and is not provided again herein.

The present embodiment can perform resource distribution and scheduling processing on the application corresponding to the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

Figure 9:
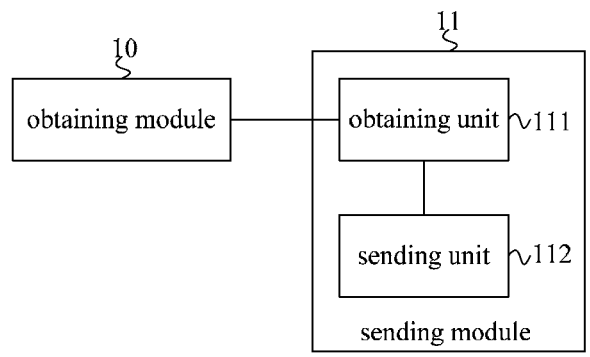
FIG. 9 is a structural diagram of a network element equipment according to another embodiment of the present disclosure.

FIG. 9 is a structural diagram of another network element equipment provided by one embodiment of the present disclosure. On the basis of the embodiment shown in the above-mentioned FIG. 8, when the network element equipment of the present embodiment is SGSN or GGSN, the sending module 11 of the network element equipment of the present embodiment further comprises: an obtaining unit 111 and a sending unit 112.

Specifically, the obtaining unit 111 is connected to the obtaining module 10, such that the obtaining unit 111 is configured to obtain the DSCP corresponding to the traffic class obtained by the obtaining module 10 according to the mapping relationship between the traffic type and the DSCP. The sending unit 112 is connected to the obtaining unit 111, and the sending unit 112 is configured to send the IP data packet which carries the DSCP corresponding to the traffic class obtained by the obtaining unit 111 to the RNC, so that the RNC obtains the traffic class corresponding to the DSCP according to the mapping relationship between the traffic type and the DSCP, and performs scheduling processing on the service data packet according to the QoS requirement corresponding to the traffic type.

The realization mechanism about realizing processing a message through the above-mentioned modules of the network element equipment of the present embodiment is same as the realization records of the embodiments of the above-mentioned correlative methods. The details can refer to the records of the embodiments of the above-mentioned correlative method, and will not be provided again herein.

The network element equipment of the present embodiment obtains the traffic type of the service data packet through the above-mentioned units, and obtains the DSCP corresponding to the traffic class according to the mapping relationship between the traffic type and the DSCP, and sends the IP data packet which carries the DSCP corresponding to the traffic class to the RNC, so that the RNC obtains the traffic class corresponding to the DSCP according to the mapping relationship between the traffic type and DSCP, and performs scheduling processing on the service data packet according to the QoS requirement corresponding to the traffic type. The present embodiment can perform scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

Figure 10:
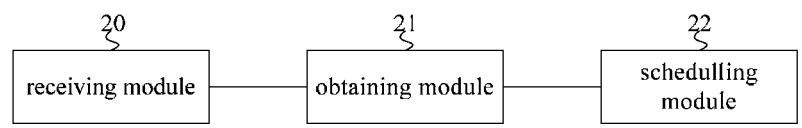
FIG. 10 is a structural diagram of a RNC equipment according to one embodiment of the present disclosure.

FIG. 10 is a structural diagram of a RNC equipment provided by one embodiment of the present disclosure. As shown in FIG. 10, the RNC equipment of the present embodiment may comprise: a receiving module 20, an obtaining module 21, and a scheduling module 22.

The receiving module 20 is configured to receive a message or a data packet which carries the traffic type of the service data packet sent from the network element equipment. The obtaining module 21 is connected to the receiving module 20, and is configured to obtain the traffic type from the message or the data packet received by the receiving module 20. The scheduling module 22 is connected to the obtaining module 21, and is configured to perform scheduling processing on the service data packet according to the QoS requirement corresponding to the traffic type obtained by the obtaining module 21.

The realization mechanism about realizing processing a message through the above-mentioned modules of the RNC equipment of the above-mentioned embodiment is same as the realization records of the embodiments of the above-mentioned correlative methods. The details can refer to the records of the embodiments of the above-mentioned correlative method, and will not be provided again herein.

The RNC equipment of the present embodiment receives the message or the data packet which carries the traffic type of the service data packet and which is sent from the network element equipment through the above-mentioned modules, obtains the traffic type and performs scheduling processing on the service data packet according to the QoS requirement corresponding to the traffic type. The present embodiment can perform the scheduling processing on the service data packet based on the traffic type. Comparing with the scheduling processing based on the traffic class in the prior art, the granularity of classification of the present embodiment is more refined, so the present embodiment can realize more refined scheduling processing, and can effectively improve the efficiency of scheduling processing.

In some embodiments, the receiving module 20 in the above-mentioned embodiment is specifically configured to receive the RANAP message which carries the traffic type sent from the SGSN, for example the RANAP message may be RAN assignment message.

In some embodiments, the receiving module 20 in the above-mentioned embodiment is further configured to receive the GTP-U data packet which carries the traffic type sent from SGSN or GGSN.

In some embodiments, the receiving module 20 in the above-mentioned embodiment is further configured to receive the IP data packet which carries the DSCP corresponding to the traffic class according to the mapping relationship between the traffic type and the DSCP sent from SGSN or GGSN. The corresponding obtaining module 21 is specifically configured to obtain the traffic type corresponding to the DSCP of the IP data packet received by the receiving module 20 according to the mapping relationship between the traffic type and DSCP.

In some embodiments, the receiving module 20 in the above-mentioned embodiment is further configured to receive the TEID information which carries the traffic type sent from GGSN.

The realization mechanism about realizing processing a message through the above-mentioned modules of the RNC equipment of the above-mentioned embodiment is same as the realization records of the embodiments of the above-mentioned correlative methods. The details can refer to the records of the embodiments of the above-mentioned correlative method, and are not provided again herein.

The present embodiments can perform scheduling processing on the application corresponding to the service data packet based on the traffic type. Comparing with the scheduling processing based on the traffic class in the prior art, the granularity of classification of the present embodiment is more refined, which can realize more refined scheduling processing, and can effectively improve the efficiency of scheduling processing. On the basis of the above-mentioned embodiment, the RNC equipment can further comprise a first sending module. The first sending module is connected to the obtaining module 21, and is configured to send the downlink data frame which carries the traffic type obtained by the obtaining module 21 to the NodeB, so that the NodeB performs resource allocation and scheduling processing on the applications corresponding to the service data packet according to the QoS requirement corresponding to the traffic type.

Or, on the basis of the above-mentioned embodiment, the RNC equipment can further comprise a second sending module. The second sending module is also connected to the obtaining module 21, and is configured to send the downlink data frame which carries the traffic type obtained by the obtaining module 21 to the drifting RNC, so that the drifting RNC obtains the traffic type, and performs scheduling processing on the service data packet according to the QoS requirement corresponding to the traffic type. Specifically, the second sending module can further configured to send the downlink data frame which carries the traffic type to the drifting RNC, so that the drifting RNC obtains the traffic type; and performs scheduling processing on the service data packet according to the QoS requirement corresponding to the traffic type, or the drifting RNC further sends the downlink data frame which carries the traffic type to the NodeB, so that the NodeB performs resource allocation and scheduling processing on the applications corresponding to the service data packet according to the QoS requirement corresponding to the traffic type. The details can refer to the records of the above-mentioned embodiments, and will not be provided again herein.

By adopting the technical solutions of the above-mentioned embodiments, the granularity of classification of various applications is more refined, so the present embodiment can realize more refined scheduling processing, and can effectively improve the efficiency of scheduling processing.

Figure 11:
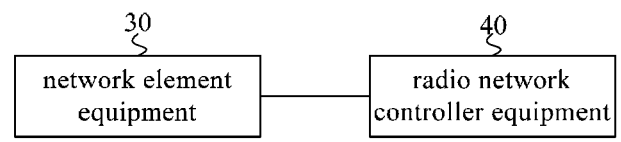
FIG. 11 is a structural diagram of a system for processing a message according to one embodiment of the present disclosure.

FIG. 11 is a structural diagram of a system for processing a message provided by one embodiment of the present disclosure. As shown in FIG. 11, the system for processing a message of the present embodiment can comprise a network element equipment 30 and a RNC equipment 40. The network element equipment 30 is connected to the RNC equipment 40.

In some embodiments, the network element equipment 30 is configured to obtain a traffic type of a service data packet and to send a message or a data packet which carries the traffic type to the RNC equipment 40. The RNC equipment 40 is configured to receive the message or the data packet which carries the traffic type of the service data packet and which is sent from the network element equipment 30; and configured to obtain the traffic type and to perform scheduling processing on the service data packet according to a QoS requirement corresponding to the traffic type.

The network element equipment of the present embodiment may be SGSN or GGSN. The network element equipment of the present embodiment can adopt the network element equipment of the embodiments shown in the above-mentioned FIG. 8 to FIG. 9. The RNC equipment of the present embodiment can specifically adopt the RNC equipment of the embodiment shown in the above-mentioned FIG. 10.

The realization mechanism about realizing processing a message by adopting the network element equipment 30 and the RNC equipment 40 of the system for processing a message of the present embodiment is same as the realization mechanism of the embodiments of the above-mentioned correlative methods. The details can refer to the realization mechanism of the embodiments of the above-mentioned correlative methods, and is not provided again herein.

The system for processing a message of the present embodiment obtains the traffic type of the service data packet by adopting network element equipment, and sends the message or the data packet which carries the traffic type to the RNC equipment 40. The system for processing a message of the present embodiment receives the message or the data packet which carries the traffic type of the service data packet and which is sent from the network element equipment 30 by adopting the RNC equipment; obtains the traffic type; and performs scheduling processing on the service data packet according to the QoS requirement corresponding to the traffic type. The present embodiment can perform resource distribution and scheduling processing on the application corresponding to the service data packet based on the traffic type. Comparing with the resource allocation and scheduling processing based on the traffic class in the prior art, the granularity of classification of the present embodiment is more refined, so the present embodiment can realize more refined resource allocation and scheduling processing, and can effectively improve the efficiency of scheduling processing.

All the above-mentioned technical solutions of the embodiments of the present disclosure can be applied to all the communication systems, for example, code division multiple access (CDMA, Code Division Multiple Access), wideband code division multiple access (WCDMA, Wideband Code Division Multiple Access), general packet radio service (GPRS, General Packet Radio Service), global system for mobile communications (Global System for Mobile Communications; hereinafter referred to as GSM) or the 3rd generation partnership project long term evolution (3rd Generation Partnership Project Long Term Evolution; hereinafter referred to as LTE).

For convenience and simplicity of description, corresponding processes of the aforementioned method embodiments may be referred to for specific operation processes of the above described systems, devices and units, which are not described repeatedly herein.

In the several embodiments provided by the present application, the disclosed systems, devices, and methods may be implemented in other manners. For example, device embodiments described above are just illustrative. For example, the units could be divided according to logical functions, or other division manners for practical implementations. For example, multiple units or components may be combined or integrated into another system, or some features may be neglected or may not be performed. At another point, the displayed or discussed mutual coupling or direct coupling or communication link may be through some interfaces, and indirect coupling or communication link for devices or units may be in an electrical form, a mechanical form or other form.

The units described as separated parts may be or may not be physically separated, and the parts displayed as units may be or may not be physical units, which may be located in one place or distributed to multiple network elements. Part or all units therein may be selected to implement the target of solutions provided in the present disclosure according to the actual demands.

In addition, in various embodiments of the present disclosure, various functional units may be integrated into one processing unit, or each unit may exist separately and physically, or two or more units may be integrated into one unit. The above integrated units may be implemented in the form of hardware or may be implemented in the form of software functional unit.

When the integrated unit is implemented in the form of a software functional unit and is sold or used as an independent product, the integrated unit may be stored in a computer readable storage medium. Based on this understanding, the technical solution or part that makes contributions to the prior art of the technical solution in the present disclosure may be essentially embodied in the form of a software product. The computer software product may be stored in a storage medium, and includes a number of instructions that enable a piece of computer equipment (may be a personal computer, a server, or a network equipment) to execute all or part of steps of the methods described in various embodiments of the present disclosure. The preceding storage mediums includes various mediums that can store codes, such as, a U disk, a removable hard disk, a read-only memory (ROM, Read-Only Memory), a random access memory (RAM, Random Access Memory), a magnetic disk, an optical disk, or the like.

It should be noted that the above embodiments are only some embodiments of the present disclosure and give no limit to the present disclosure. Although a detailed illustration to the present disclosure is given referring to the above mentioned embodiments, it should be appreciated for those skilled in the art that the technical solutions recorded in the embodiments described above can still be modified, or some of the technical features thereof can be replaced. Such modifications and replacements will not make the nature of the corresponding technical solutions depart from the scope of the embodiments of the present disclosure.

What is claimed is:

1. A method for processing a message, comprising:
obtaining, by a network element equipment of a core network, a traffic type of a service data packet of an application after a quality of service requirement profile parameter corresponding to a traffic class is negotiated with the network element equipment, wherein the traffic type is one of multiple traffic types included in the traffic class, and wherein the traffic type corresponds to the application;
sending, by the network element equipment, one of the message and a data packet that carries the traffic type to a radio network controller, wherein the radio network controller obtains the traffic type and performs scheduling processing on the service data packet according to a quality of service requirement corresponding to the traffic type, and the quality of service requirement is set for the traffic type according to the quality of service requirement profile parameter, the network element equipment, and features of the application corresponding to the traffic type;
wherein the network element equipment is one of a serving general packet radio service (GPRS) support node and a gateway GPRS support node, the method further comprising:
sending, by one of the serving GPRS support node and the gateway GPRS support node, a GPRS tunneling protocol data packet of user plane that carries the traffic type to the radio network controller, wherein the traffic type is carried in an added field of a header of the GPRS tunneling protocol data packet of user plane.

2. The method for processing a message according to claim 1, further comprising:
sending, by the serving GPRS support node, a radio access network application part message that carries the traffic type to the radio network controller.

3. The method for processing a message according to claim 2, wherein the radio access network application part message is a radio access bearer assignment message.

4. The method for processing a message according to claim 1, further comprising:

obtaining, by one of the serving GPRS support node and the gateway GPRS support node, a differentiated services code point corresponding to a traffic class according to a mapping relationship between the traffic type and the differentiated services code point; and sending, by one of the serving GPRS support node and the gateway GPRS support node, an internet protocol data packet that carries the differentiated services code point corresponding to the traffic class to the radio network controller, wherein the radio network controller obtains the traffic class corresponding to the differentiated services code point according to the mapping relationship between the traffic type and the differentiated services code point.

5. The method for processing a message according to claim 1, further comprising:

sending, by the gateway GPRS support node, a tunnel endpoint identifier message that carries the traffic type to the radio network controller.

6. The method for processing a message according to claim 5, wherein the tunnel endpoint identifier message that is sent from the gateway GPRS support node to the radio network controller further carries a traffic class.

7. The method for processing a message according to claim 1, wherein the obtaining the traffic type of the service data packet comprises one of the following steps:

obtaining the traffic type through one of a deep packet inspection and a shallow packet inspection;

obtaining the traffic type from a traffic detection function entity; and obtaining the traffic type from a policy and charging rules function entity.

8. The method for processing a message according to claim 1, further comprising:

sending a downlink data frame that carries the traffic type to a base station so that the base station performs a resource allocation and scheduling processing on an application corresponding to the service data packet according to the quality of service requirement corresponding to the traffic type.

9. A method for processing a message, comprising:

receiving, by a radio network controller, one of the message and a data packet of an application that carries a traffic type of a service data packet sent from a network element equipment of a core network after a quality of service requirement profile parameter corresponding to a traffic class is negotiated with the network element equipment, wherein the traffic type is one of multiple traffic types included in the traffic class, and wherein the traffic type corresponds to the application;

receiving, by the radio network controller, a general packet radio service (GPRS) tunneling protocol data packet of user plane that carries the traffic type sent from one of a serving GPRS support node and a gateway GPRS support node, wherein the traffic type is carried in an added field of a header of the GPRS tunneling protocol data packet of user plane;

obtaining, by the radio network controller, the traffic type; and performing, by the radio network controller, scheduling processing on the service data packet according to a quality of service requirement corresponding to the traffic type, wherein the quality of service requirement is set for the traffic type according to the quality of service requirement profile parameter, the network element equipment, and features of the application corresponding to the traffic type.

10. The method for processing a message according to claim 9, further comprising:

receiving a radio access network application part message that carries the traffic type sent from the serving GPRS support node.

11. The method for processing a message according to claim 10, wherein the radio access network application part message is a radio access bearer assignment message.

12. The method for processing a message according to claim 9, further comprising:

receiving an internet protocol data packet that carries a differentiated services code point corresponding to a traffic class sent from one of the serving GPRS support node and the gateway GPRS support node according to a mapping relationship between the traffic type and the differentiated services code point; and obtaining the traffic type corresponding to the differentiated services code point according to the mapping relationship between the traffic type and the differentiated services code point.

13. The method for processing a message according to claim 9, further comprising:

receiving a tunnel endpoint identifier message that carries the traffic type sent from the gateway GPRS support node.

14. The method for processing a message according to claim 13, wherein the tunnel endpoint identifier message further carries a traffic class.

15. The method for processing a message according to claim 9, further comprising:

sending a downlink data frame that carries the traffic type to a base station, so that the base station performs a resource allocation and the scheduling processing on an application corresponding to the service data packet according to the quality of service requirement corresponding to the traffic type.

16. The method for processing a message according to claim 9, further comprising:

sending a downlink data frame that carries the traffic type to a drifting radio network controller, so that the drifting radio network controller obtains the traffic type and performs the scheduling processing on the service data packet according to the quality of service requirement corresponding to the traffic type.

17. The method for processing a message according claim 16, further comprising:

sending the downlink data frame that carries the traffic type to a base station, so that the base station performs resource allocation and the scheduling processing on an application corresponding to the service data packet according to the quality of service requirement corresponding to the traffic type.

18. A network element equipment, comprising:

a processor, configured to obtain a traffic type of a service data packet of an application after a quality of service requirement profile parameter corresponding to a traffic class is negotiated with the network element equipment, wherein the traffic type is one of multiple traffic types included in the traffic class, and wherein the traffic type corresponds to the application; and a transmitter, configured to send one of a message and a data packet that carries the traffic type to a radio network controller, wherein the radio network controller obtains the traffic type and performs scheduling processing on the service data packet according to a quality of service requirement corresponding to the traffic type, and the quality of service requirement is set for the traffic type according to the quality of service requirement profile parameter, the network element equipment, and features of the application corresponding to the traffic type;

wherein the network element equipment is one of a serving general packet radio service (GPRS) support node and a gateway GPRS support node, and wherein the transmitter is further configured to send a GPRS tunneling protocol data packet of user plane that carries the traffic type to the radio network controller, wherein the traffic type is carried in an added field of a header of the GPRS tunneling protocol data packet of user plane.

19. The network element equipment according to claim 18, wherein the network element equipment is the serving GPRS support node, and the transmitter is further configured to send a radio access network application part message that carries the traffic type to the radio network controller.

20. The network element equipment according to claim 18,
wherein the processor is further configured to obtain a differentiated services code point corresponding to a traffic class according to a mapping relationship between the traffic type and the differentiated services code point, and
wherein the transmitter is further configured to send an internet protocol data packet that carries the differentiated services code point corresponding to the traffic class to the radio network controller, so that the radio network controller obtains the traffic class corresponding to the differentiated services code point according to the mapping relationship between the traffic type and the differentiated services code point, and performs the scheduling processing on the service data packet according to the quality of service requirement corresponding to the traffic type.

21. The network element equipment according to claim 18, wherein the network element equipment is the serving GPRS support node, and the transmitter is further configured to send a tunnel endpoint identifier message that carries the traffic type to the radio network controller.

22. The network element equipment according to claim 18, wherein the processor is further configured to perform one of:
obtaining the traffic type through one a deep packet inspection and a shallow packet inspection;
obtaining the traffic type from a traffic detection function entity; and
obtaining the traffic type from a policy and charging rules function entity.

23. The network element equipment according to claim 18, wherein the transmitter is further configured to send a downlink data frame that carries the traffic type to a base station so that the base station performs resource allocation and the scheduling processing on an application corresponding to the service data packet according to the quality of service requirement corresponding to the traffic type.

24. A radio network controller equipment, comprising:
a receiver, configured to:
receive one of a message and a data packet that carries a traffic type of a service data packet of an application sent from a network element equipment of a core network after a quality of service requirement profile parameter corresponding to a traffic class is negotiated with the network element equipment wherein the traffic type is one of multiple traffic types included in the traffic class, and wherein the traffic type corresponds to the application, and
receive a general packet radio service (GPRS) tunneling protocol data packet of user plane that carries the traffic type sent from one of a serving GPRS support node and a gateway GPRS support node, wherein the traffic type is carried in an added field of a header of the GPRS tunneling protocol data packet of user plane; and
a processor, configured to obtain the traffic type and perform scheduling processing on the service data packet according to a quality of service requirement corresponding to the traffic type, wherein and the quality of service requirement is set for the traffic type according to the quality of service requirement profile parameter, the network element equipment, and features of the application corresponding to the traffic type.

25. The radio network controller equipment according to claim 24, wherein the receiver is further configured to receive a radio access network application part message that carries the traffic type sent from the serving GPRS support node.

26. The radio network controller equipment according to claim 24, wherein:
the receiver is further configured to receive an internet protocol data packet that carries a differentiated services code point corresponding to a traffic class sent from one of the serving GPRS support node and the gateway GPRS support node according to a mapping relationship between the traffic type and the differentiated services code point; and
the processor is further configured to obtain the traffic type corresponding to the differentiated services code point according to a mapping relationship between the traffic type and the differentiated services code point.

27. The radio network controller equipment according to claim 24, wherein the receiver is further configured to receive a tunnel endpoint identifier message that carries the traffic type sent from the gateway GPRS support node.

28. The radio network controller equipment according to claim 24, further comprising:
a transmitter, configured to send a downlink data frame that carries the traffic type to a base station, wherein the base station performs a resource allocation and the scheduling processing on an application corresponding to the service data packet according to the quality of service requirement corresponding to the traffic type.

29. The radio network controller equipment according to claim 24, further comprising:
a transmitter, configured to send a downlink data frame that carries the traffic type to a drifting radio network controller that obtains the traffic type and performs the scheduling processing on the service data packet according to the quality of service requirement corresponding to the traffic type.

30. The radio network controller equipment according to claim 29, wherein the transmitter is further configured to send the downlink data frame that carries the traffic type to a base station so that the base station performs resource allocation and the scheduling processing on an application corresponding to the service data packet according to the quality of service requirement corresponding to the traffic type.

31. A processing message system, comprising:
a network element equipment wherein the network element equipment is one of a serving general packet radio service (GPRS) support node and a gateway GPRS support node, the network element equipment configured to:
obtain a traffic type of a service data packet of an application after a quality of service requirement profile parameter corresponding to a traffic class is negotiated with the network element equipment, wherein the traffic type is one of multiple traffic types included in the traffic class, and wherein the traffic type corresponds to the application, and
send one of a message and a data packet that carries the traffic type to a radio network controller equipment; and the radio network controller equipment, configured to:
receive one of the message and the data packet that carries the traffic type of the service data packet sent from the network element equipment,
receive a GPRS tunneling protocol data packet of user plane that carries the traffic type sent from one of the serving GPRS support node and the gateway GPRS support node, wherein the traffic type is carried in an added field of a header of the GPRS tunneling protocol data packet of user plane,
obtain the traffic type, and
perform scheduling processing on the service data packet according to a quality of service requirement corresponding to the traffic type, wherein and the quality of service requirement is set for the traffic type according to the quality of service requirement profile parameter, the network element equipment, and features of the application corresponding to the traffic type.

* * * * *

UNITED STATES PATENT AND TRADEMARK OFFICE
CERTIFICATE OF CORRECTION

PATENT NO. : 9,699,766 B2  
APPLICATION NO. : 13/928986  
DATED : July 4, 2017  
INVENTOR(S) : Chen et al.

Page 1 of 1

It is certified that error appears in the above-identified patent and that said Letters Patent is hereby corrected as shown below:

On the Title Page

References Cited, U.S. Patent Documents, Page 2, Column 2, Line 14, Inventor name for 2013/0121161 A1 should read -- Szabo --.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*